United States Patent [19]

Kerman

[11] 4,203,738
[45] May 20, 1980

[54] COMBINATION AIR FILTER AND VACUUM CLEANING SYSTEM

[76] Inventor: Kenneth C. Kerman, 1126 6th St., Santa Monica, Calif. 90403

[21] Appl. No.: 960,472

[22] Filed: Nov. 13, 1978

[51] Int. Cl.² ............................................. B01D 46/04
[52] U.S. Cl. ........................................ 55/287; 55/294; 55/350; 55/483; 55/492; 55/499
[58] Field of Search ............... 55/286, 287, 294, 302, 55/341 MC, 341 PC, 350, 483, 484, 492, 497, 499, 500, 501, 284

[56] References Cited

U.S. PATENT DOCUMENTS

| | | | |
|---|---|---|---|
| 3,306,012 | 2/1967 | Wallin | 55/484 |
| 3,505,792 | 4/1970 | Dahlem | 55/294 |
| 3,555,785 | 1/1971 | Wooldrige et al. | 55/294 |
| 3,712,033 | 1/1973 | Gronholz | 55/500 |
| 3,747,772 | 7/1973 | Brown | 55/501 |

FOREIGN PATENT DOCUMENTS

| | | | |
|---|---|---|---|
| 222629 | 1/1962 | Austria | 55/302 |
| 1951184 | 4/1971 | Fed. Rep. of Germany | 55/500 |
| 2267816 | 11/1975 | France | 55/484 |

Primary Examiner—David L. Lacey
Attorney, Agent, or Firm—Ralph B. Pastoriza

[57] ABSTRACT

The air filter and vacuum cleaning system includes an air filter unit having partitions and filtering material arranged to define a plurality of air channels between the air entrance and exit ends of the filter. The filter material itself is in the form of a cloth strip of fibrous material such as glass fibers and is wound back and forth about the ends of the partitions adjacent the entrance and exit openings of the filter to provide folds. A vacuum cleaning head is mounted for movement across the entrance end of the filter, the head having a vacuum slot cooperating with the air channels and folds of the filter material to result in high velocity air which will pick up and move slugs of accumulated impurities on the inner folds of the filter material adjacent the air exit end. Some of the impurities themselves exert a scrubbing action on the filter material forming part of the channel walls so that the entire filter unit can be cleaned by one sweep of the vacuum head without the necessity of inserting a vacuum head between the various folds of the filter material.

6 Claims, 6 Drawing Figures

COMBINATION AIR FILTER AND VACUUM CLEANING SYSTEM

This invention relates generally to air filter systems and more particularly to a combination air filter and vacuum cleaning system for enabling automatic and periodic cleaning of air filter units without the necessity of disassembling the units or applying mechanical shaking action thereto.

BACKGROUND OF THE INVENTION

Air filter units in the form of cassettes or cartridges are well known in the art and find wide use in commercial plants and other areas where harmful particulate matter, dust and the like must be removed from the air. Generally, the air filter units are disposed over a hopper or similar structure for collecting air impurities that fall by gravity. The air itself is drawn into the lower end of the filter cartridge or cassette and passes out the upper end. In this respect, there is normally provided an air duct above the filter incorporating an appropriate blower for moving the air through the filter and back into the room, outdoors or other area.

To clean filters, the normal practice has involved periodically mechanically shaking the filters so that shaken loose impurities will simply fall into the collection hopper. In addition, or as a replacement to the mechanical shaking technique, vacuum cleaning systems of many different types have been proposed. However, such systems as exist have not really been effective particularly where the filter unit has a substantial depth between the entrance and exit air openings and the folds of filter material are too close to permit direct traverse by a nozzle.

More particularly, in vacuum cleaning systems, a vacuum head is simply moved across the entrance air opening of the filter with the hope that impurities will be removed from the filtering material. While some impurities of course are necessarily removed close to the entrance end of the filter, the impurities in the interior of the filter and close to the exit end cannot easily be so removed. As a consequence, for effective cleaning by vacuum, it has been necessary to either diassemble the filter in order to provide access to the interior thereof or, alternatively, design vacuum heads such that they can be physically inserted within the filter to clean surfaces of the filtering material. Neither of these solutions are particularly satisfactory since down time is required during the cleaning operation.

There is a need, accordingly, for a filter cleaning system wherein a vacuum head can readily be passed along the air entrance opening for the filter unit or units to provide effective cleaning without having to disassemble the filter units or design a head for movement within the filter unit. Such a system would have certain advantages not possible with presently available systems. For example, no down time whatever would be required since the vacuum head could be operated while the filter units are still in operation. Moreover, the system would lend itself to automatic timer control for consistent periodic cleaning.

BRIEF DESCRIPTION OF THE PRESENT INVENTION

Bearing the foregoing considerations in mind, the present invention contemplates a unique combination of vacuum head and filter unit wherein substantially all of the impurities in the filtering material can be removed by a single sweep of a vacuum cleaner head across the entrance opening of the filter. As a consequence, it is not necessary to disassemble the filter or to provide a vacuum cleaning head capable of reaching within the interior of the filter.

More particularly, I have discovered that by properly dimensioning a vacuum head slot relative to chamber and channel portions resulting from the arrangement of partitions and filtering material in the filter itself, a surprising and unexpected vacuum cleaning of the entire filter can be achieved.

Briefly, the air filter and vacuum cleaning system of my invention includes an air filter unit having partitions and filtering material arranged to define a plurality of chambers or air channels between the air entrance and exit ends of the filter. A vacuum cleaning head for connection to a vacuum source is mounted for movement across the entrance end of the filter, the head having a vacuum slot dimensioned to cooperate with the air channels to result in high velocity air flow through those channels across which the slot progressively passes. This high velocity air confined within the channel picks up and removes slugs of accumulated impurities on the filter material adjacent to the exit end of the filter.

I have also discovered that the cooperative action between the vacuum head slot as it progressively moves in close engagement with the entrance portion of the filter and the channels results in a scrubbing action of the various impurities on the wall portions of the channels defined by the filter material. As a consequence, virtually the entire filter throughout its depth from the bottom air opening to the top exit opening is cleaned with a single sweep of the vacuum head.

BRIEF DESCRIPTION OF THE DRAWINGS

A better understanding of this invention will be had by now referring to a preferred embodiment as shown in the accompanying drawings in which.

DETAILED DESCRIPTION OF THE INVENTION

Figure 1:
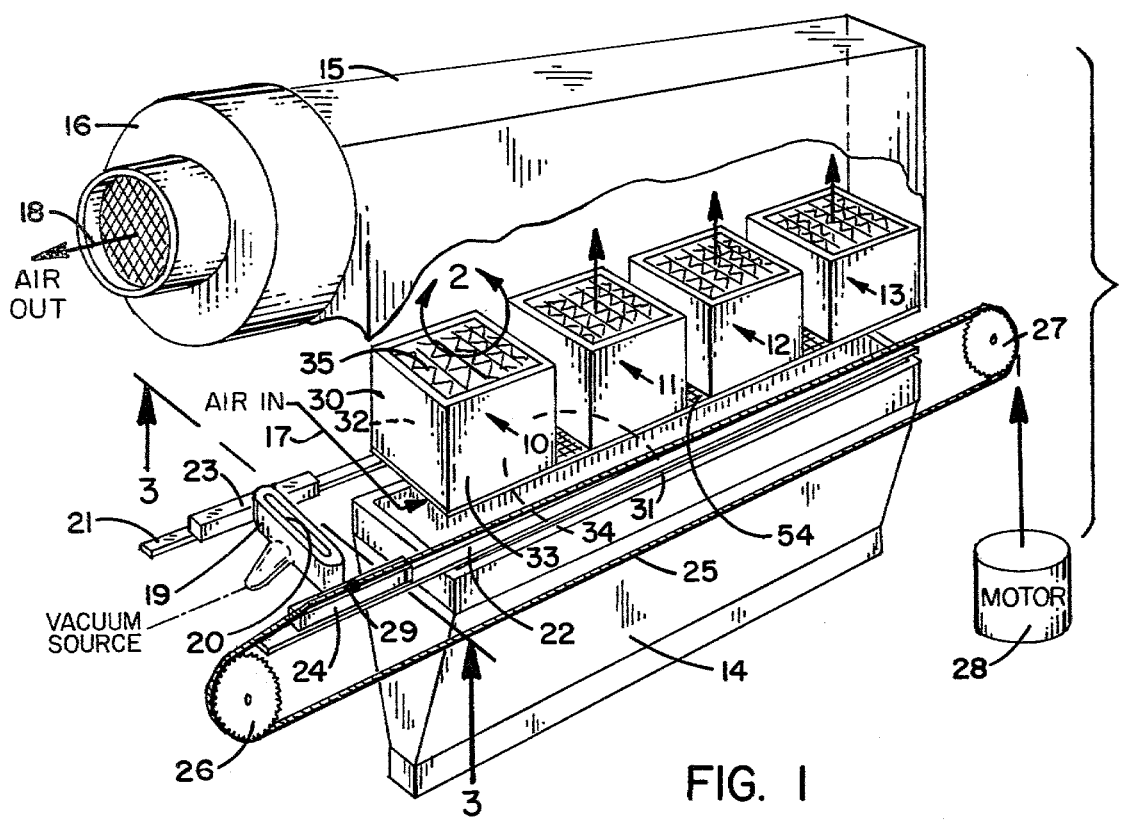
FIG. 1 is a broken away perspective view highly schematic in nature illustrating a plurality of filter units together with a vacuum cleaning head part of the system in accord with the present invention.

Referring first to FIG. 1, there is shown a plurality of filter units in the form of cassettes or cartridges 10, 11, 12 and 13 in horizontal alignment. Co-extensive with the filter units is an impurity accumulating hopper positioned below the bottom entrance openings of the units as shown at 14 for receiving impurities dropped by gravity. An upper air guiding duct 15, in turn, is in communication with the top exit openings of the various units and includes a blower 16 for moving air through the filter units.

While the units 10-13 are shown slightly spaced from each other, it will be understood that they may be contiguous, the walls of the ducting 15 engaging the side walls of the units so that entering air will pass through the units and not therebetween or around the sides. If slightly spaced, proper sealing can be provided by a horizontal position with openings registering with the exit openings. Such incoming air is received through the bottom air entrance openings of the filters to be subsequently described, this air entering beneath the lower edges of the ducting 15 as indicated by the arrow 17. The open top of the hopper 14 is spaced sufficiently below the bottom entrance openings of the filters as to allow air to pass into the side of the unit and up through the filters. Filtered air exits from the blower as indicated by the arrow 18.

Still referring to FIG. 1, there is shown a vacuum system for removing accumulated impurities from the various filter units. This system includes a vacuum head 19 for connection to a vacuum source. Head 19 is provided with a vacuum slot 20. A pair of guide tracks 21 and 22 running along parallel and adjacent to the lower ends of the left and right side walls of the various filter unit housings are shown. The vacuum head 19 itself includes left and right enclosures or housings 23 and 24 arranged to travel along the tracks, these enclosures being in communication with the head 19. Small rollers inhibit lateral movement.

Any appropriate means may be provided for moving the vacuum head to traverse across the bottom entrance openings of the various filter units. In FIG. 1, an example of one means includes a sprocket chain 25 passing over sprocket wheels 26 and 27 positioned adjacent to the beginning and end of the aligned filters. One of the sprocket wheels such as 27 may be driven by a reversible motor 28. A given point 29 on the sprocket chain 25 is secured to the head 19 by connection to the enclosure 24.

With the foregoing arrangement, it will be evident that operation of the motor 28 in one direction to rotate the sprocket wheel 27 will move the vacuum head 19 under the various filter units. When the vacuum head has traversed the last filter unit, the motor 28 is reversed so that the head can sweep back to return to its initial position. An appropriate timer (not shown) may be connectd to the motor so that the vacuum cleaning of the filters can automatically be carried out at desired periodic intervals. In this respect, it should be understood that the filtering units can continue to function in their filtering operation with the blower 16 still operating during sweeping by the vacuum head 19.

Each of the various filter units 10 through 13 are identical and therefore a detailed description of one will suffice for all. Thus considering specifically the filter unit 10 shown in FIG. 1, this unit includes a housing having front and rear side walls 30 and 31 and left and right side walls 32 and 33, the four side walls defining rectangular bottom entrance and top exit openings 34 and 35, respectively.

Figure 2:
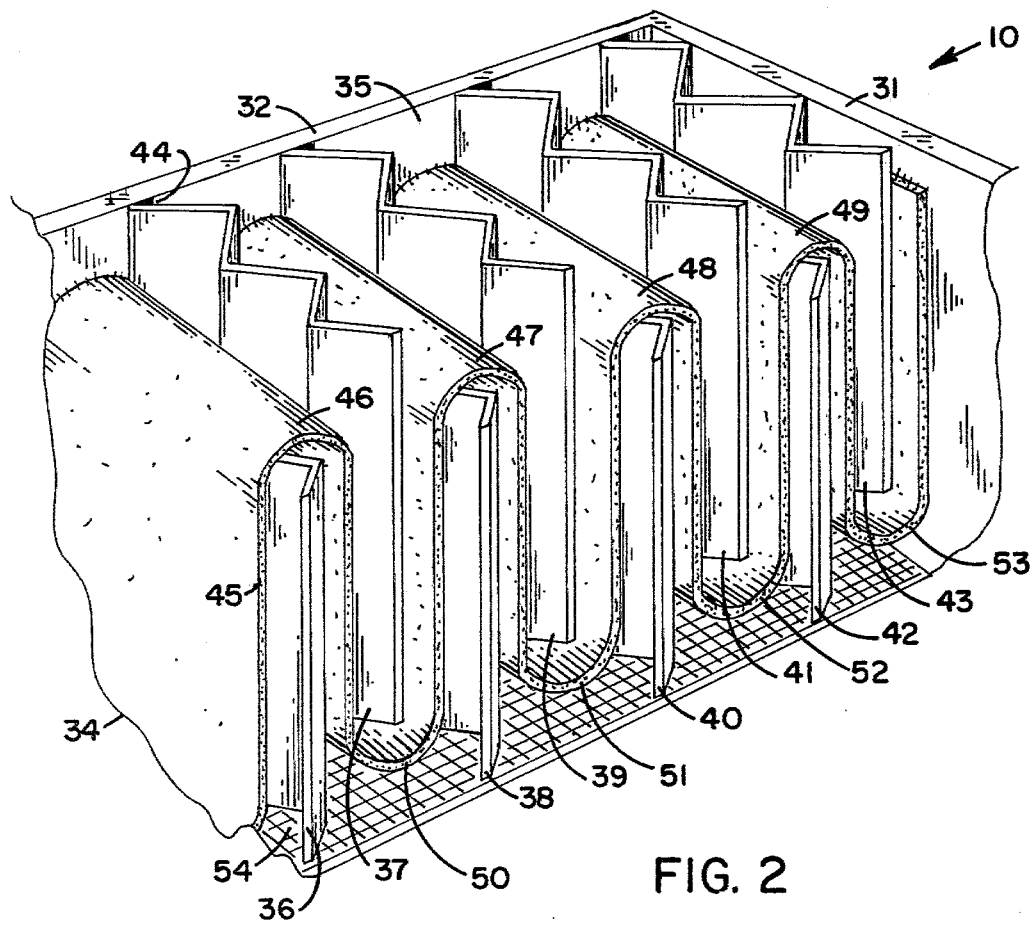
FIG. 2 is a greatly enlarged fragmentary perspective view of a portion of one of the filters enclosed within the circular arrow 2 of FIG. 1.

Referring specifically to the enlarged fragmentary view of the filter 10 as shown in FIG. 2, within the housing there is provided a plurality of vertical partitions 36, 37 38, 39, 40, 41, 42, and 43. Alternate partitions such as the partitions 36, 38, 40, and 42 have their lower ends starting in the plane of the bottom entrance opening 34 and terminate at their upper ends short of the plane of the top exit opening 35. The remaining partitions 37, 39, 41 and 43 in turn, have their upper ends starting in the plane of the top exit opening 35 and terminate short of the plane of the bottom entrance opening 34. Each of the partitions is corrugated along vertical bend lines to present a zig-zag appearance when viewed from the top all as shown in FIG. 2. The left and right ends of each of the partitions are secured to the left and right side walls 32 and 33 described in FIG. 1 of the filter unit housing. Only side wall 32 is shown in FIG. 2, a typical securement of one of the partitions such as the partition 37 being illustrated at 44.

The filter interior is completed by the provision of a cloth-like fibrous filtering strip 45 of width corresponding to the distance between the left and right side walls of the unit. The fibrous strip 45 may include glass fibers and as shown passes over the first of the alternate partitions 36 and thence under the first of the remaining partitions 37. The cloth strip continues in an up and down manner to define upper folds such as indicated at 46, 47, 48 and 49 about the ends of those partitions terminating short of the plane of the exit opening 35 and, similarly, lower folds 50, 51, 52 and 53 about the lower ends of those partitions terminating short of the plane of the entrance opening 34. The portions of the strip 45 between the upper and lower folds passing between the partitions are held in generally vertical parallel planes by the corrugated partitions as shown and the strip ends and edges are sealed to the inside having walls such as 31 and 32.

In FIG. 2 there is illustrated covering the bottom entrance opening 34 a thin protective screen 54 which aligns the partitions and permits traverse of the vacuum head without bending the partitions or damaging the folds. This screen 54 is also indicated in FIG. 1 passing beneath the horizontally aligned filter units.

Figure 3:
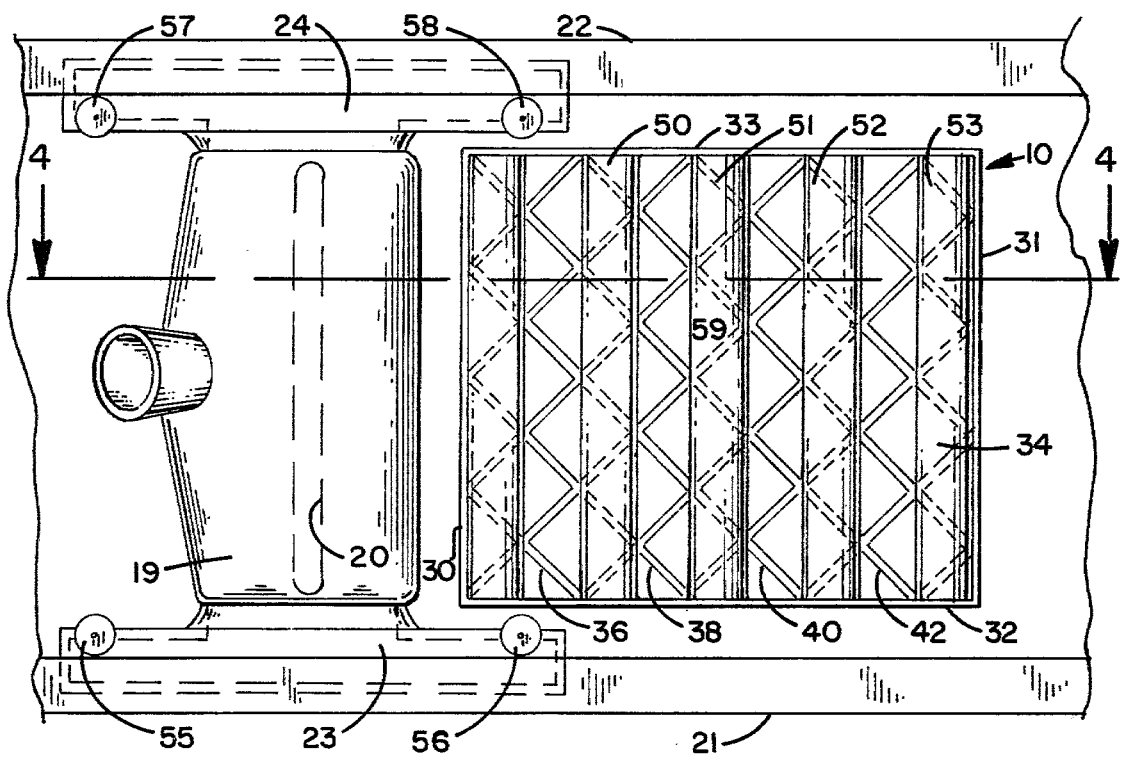
FIG. 3 is a fragmentary bottom plan view of the system looking in the direction of the arrows 3—3 of FIG. 1.

Referring now to the underside fragmentary plan view of FIG. 3, there is shown the bottom air entrance opening 34 for the filter unit 10 with the left and right side walls 32 and 33 shown on the bottom and top of the FIG. as illustrated. Also in FIG. 3 is illustrated in more detail the underside of the vacuum head 19 and guide enclosures 23 and 24 overlying the tracks 21 and 22. The small rollers heretofore briefly referred to are shown at 55 and 56 mounted for rotation about vertical axes to the enclosure 23 and at 57 and 58 similarly mounted to the enclosure 24. These rollers engage opposed edge portions of the tracks 21 and 22 as clearly shown in FIG. 3 so as to inhibit the referred to possibility of lateral movement of the vacuum head 19 as it traverses beneath the various filter units.

Some of the partitions and folds making up the filtering elements of the filter unit described in FIG. 2 are visible in FIG. 3. More particularly, it will be evident that the corrugations of the various partitions such as the partition 40 define with the strip of filtering material between the lower folds 51 and 52 a series of vertical channels 59. These channels are of generally triangular shape in cross section when viewed in plan as in FIG. 3. In FIG. 3, the screen 54 of FIG. 2 has been omitted in order to avoid obscuring portions of the drawing.

Figure 4:
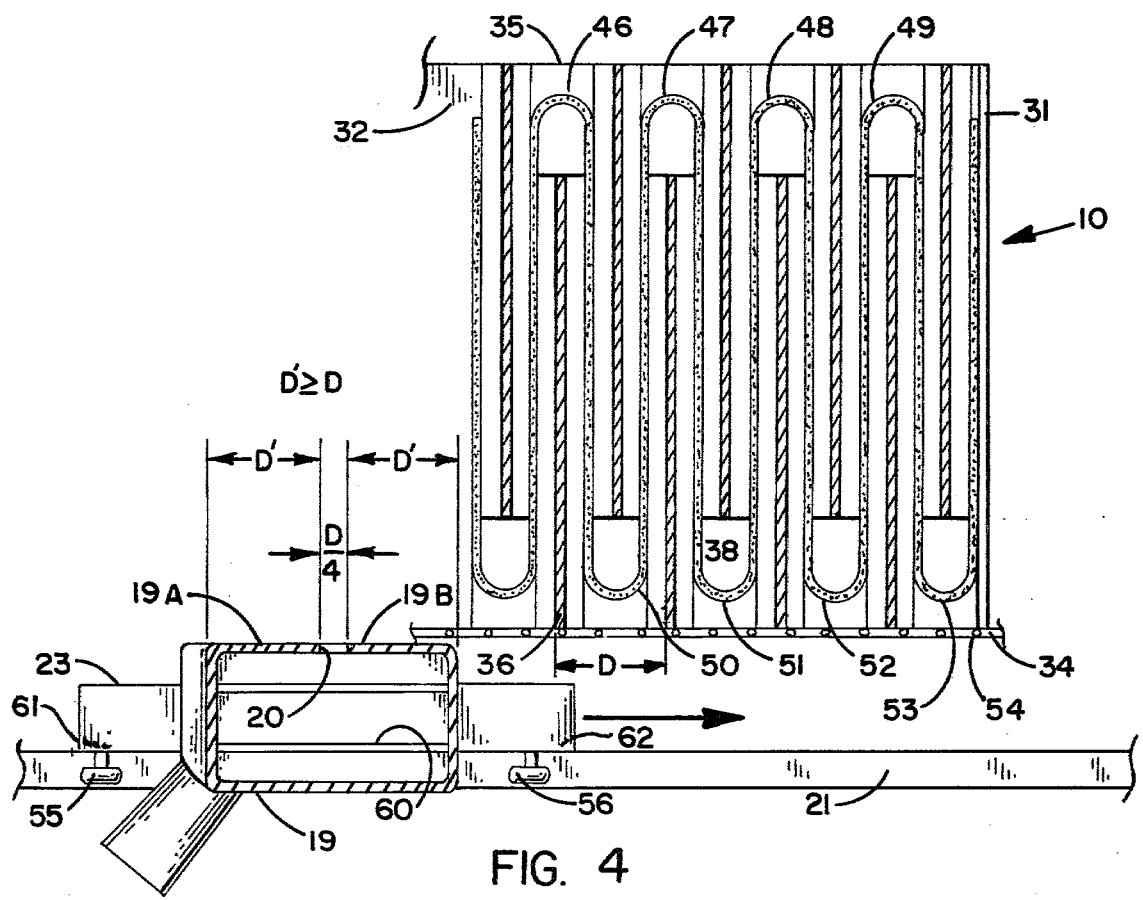
FIG. 4 is a fragmentary cross section taken in the direction of the arrows 4—4 of FIG. 3.

However, in the cross section of FIG. 4 taken in the direction of the arrows 4—4 of FIG. 3, the thin wire screen 54 is shown covering the bottom air entrance opening 34 of the filter unit. It will be noted that this screen is up against the lower ends of the alternate partitions such as partitions 36 and 38.

Referring to the lower left portion of FIG. 4, it will be noted that the enclosure 23 is in communication with the interior of the vacuum head 19 as by the open window 60. By providing small openings 61 and 62 on the front and rear of the enclosure 23, vacuum is thus communicated to these openings through the window 60 so that the track along which the enclosure rides is automatically cleaned by drawing impurities through these openings. In FIG. 4, the track 21 and the enclosure 23 as well as the rollers 55 and 56 engaging the edge of the track are shown and designated by the same numerals used in FIG. 3.

Still referring to FIG. 4, and particularly the partitions 36 and 38 enclosing the lower fold 50 of the strip material, these partitions essentially define a chamber, the distance between the partitions being designated by the letter D. The top surface of the vacuum head 19 containing the slot 20 in turn is dimensioned so that when the slot 20 registers with the chamber between the partitions 36 and 38, the remaining open portion of the chamber will be closed off by the top surfaces of the vacuum head. These top surfaces are indicated at 19a and 19b, the width of the slot 20 itself being between ⅛ and ¼ the dimension D. In FIG. 4 the slot dimension is indicated as D/4 but it may be narrower. The dimensions of the remaining surface areas 19a and 19b are indicated at D' and these distances are greater than the dimension D.

Figure 5:
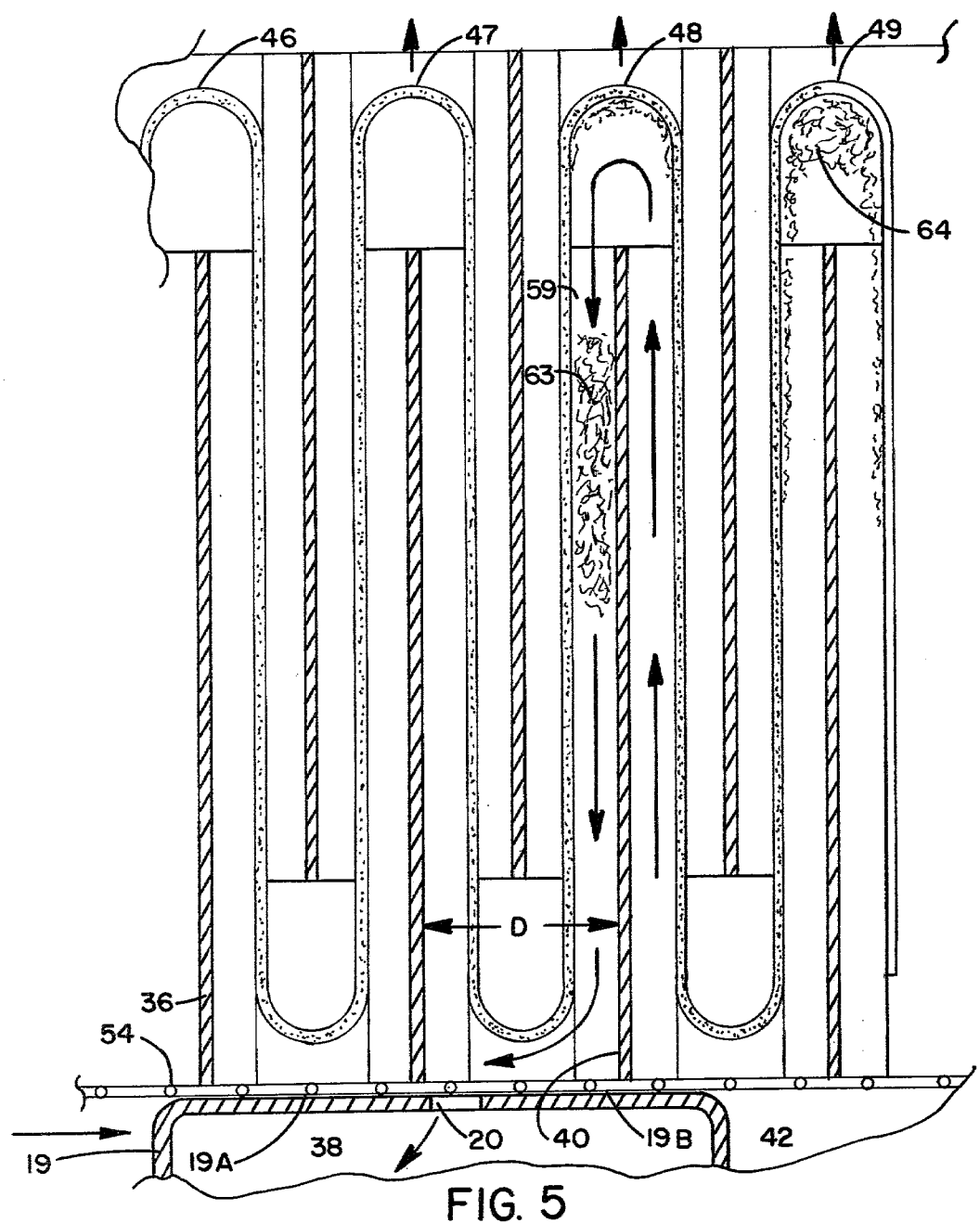
FIG. 5 is a greatly enlarged fragmentary cross section illustrating the operation of the system.

The significance of all of the foregoing will be evident by now referring to the greatly enlarged fragmentary cross section of FIG. 5 which shows the head 19 beneath both chambers defined between the partitions 36 and 38 and the partitions 38 and 40 with the vacuum slot 20 just having passed the partition 38. As the head 19 moves against the screen 54 along the various partitions at the bottom air entrance opening of the filter, the slot 20 can traverse from one partition to the next alternate partition without any other portion of the partition being exposed as a result of the extended surfaces 19a and 19b.

As a consequence of the foregoing, a high velocity air flow is established in the chamber across which the slot 20 traverses. More particularly, the high velocity air flow is a result of confined air movement in the various channels such as the channel 59 shown in FIG. 5.

In FIG. 5 there is depicted at 63 a slug of accumulated impurities in the channel 59, this slug formerly being positioned in the upper fold 48 adjacent the upper exit end opening of the filter. A similar slug of accumulated impurities is illustrated at 64 for the upper fold 49 adjacent the upper exit end. It is to be appreciated that each of the folds 46, 47, 48 and 49 and the other folds in the filter adjacent to the air exit end opening of the filter will necessarily accumulate a considerable quantity of impurities when the air flow passes through the filter from the bottom and out the top. There will also be impurities collected along the surfaces of the filter cloth between the various partitions but because of the folding, the greatest concentration of impurities will be in the upper fold portions.

When the vacuum head 19 traverses beneath the various alternate positions, the referred to high velocity air flow is established in the channels and is sufficient to progressively dislodge the various slugs when the vacuum is applied by the slot to the chamber between the partitions. Thus, in FIG. 5 with the slot entering the chamber between the partitions 38 and 40, a high vacuum is created in the channel 59 which will result in a high velocity air flow as indicated by the arrows to the right of the head 19 passing up the channel and about the fold 48 and thence down the channel 59 thus removing the slug 63. The slot 20 having already passed the chamber between the partitions 36 and 38 has cleared out the slug which would normally be in the upper fold 47. The slot 20 not having as yet reached the chamber portion between the partitions 40 and 42 has not affected the slug 64 in the upper fold 49.

It is to be appreciated that there is thus a cooperation between the slot dimension and the remaining surface portions of the vacuum head and the various channels formed by the corrugations in the partitions which results in the referred to high velocity air flow enabling removal of the impurities well within the interior of the filter. Moreover, the rapidly moving impurities along the channels effect a scrubbing action on the walls of the filter strip defining one wall of each of the various triangular shaped channels so that the entire filter strip is effectively cleaned by a single sweep of the vacuum head.

Figure 6:
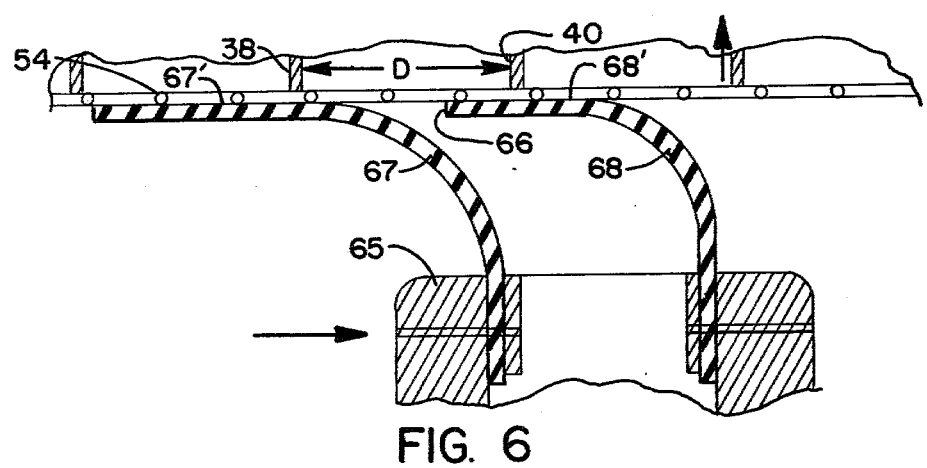
FIG. 6 is a fragmentary cross section of a modified vacuum head structure in accord with the present invention.

FIG. 6 illustrates a modified embodiment of the vacuum head wherein the slot corresponding to the slot 20 is designated at 66 and is defined by a pair of flexible lips 67 and 68 extending from the head 65. These lips are of sufficient upward extent that they can flex into flat positions to define extended surfaces indicated at 67' and 68' behind and in front of the slot 66. Each of these surfaces is greater than the dimension D between alternate partitions so that similar cooperation between the vacuum slot 66 and the various channels in the chamber to that described in conjunction with FIG. 5 for slot 20 results.

The embodiment of FIG. 6 incorporating the flexible lips is desirable where there may be some unevenness in the screen 54, the lips assuring constant physical contact with the screen itself. Also, where several filters horizontally aligned as illustrated in FIG. 1 are to be swept, it is possible that some of the filter cartridges may be vertically displaced slightly with respect to other filter cartridges. Such minor variations will be accommodated by the flexibility of the lips so that the desired vacuum cleaning action can still take place.

Reviewing the foregoing operation briefly, as the vacuum head is moved along the bottom entrance openings of the various filter units, the vacuum slot successively applies vacuum to the various channels defined by the alternate corrugated partitions as it traverses the same, the channels and slot cooperating to create a confined air movement in the channels of sufficient velocity to carry slugs from the strip folds adjacent to the exit opening. These slugs are carried along with other impurities down the channels communicating with the slot opening to remove the slugs, the air impurities themselves acting as mechanical scrubbers in their movement along the sides of the channels to further clean the strip portions between the partitions. Any horizontal vibrations set up by such air flow aids in loosening impurities. Such vibrations are often referred to in the art as "singing".

As a result, the filter units can be periodically cleaned by the vacuum system of this invention without the necessity of mechanically shaking of these filters or disassembling the filters. Moreover, because of the cooperative action between the vacuum slot and the channels formed in the filter units, it is not necessary for a vacuum head to be inserted in the filter itself to engage all surfaces of the filter cloth strip.

In cases where only a single filter cartridge is used, the side walls making up the housing themselves are oftentimes provided with flanges which can serve as tracks for supporting a vacuum head to effect a single sweep over the single filter unit. It should be appreciated, accordingly, that the specific track construction for the vacuum head in the form of the pair of track rails separated from the filter housings is only set forth as one illustrative means of guiding the vacuum head.

Various changes falling clearly within the scope and spirit of this invention will occur to those skilled in the art. The combination air filter and vacuum cleaning system accordingly is not to be thought of as limited to the specific examples set forth merely for illustrative purposes.

I claim:

1. An air filter and vacuum cleaning system including, in combination:
   (a) at least one filter unit comprising:
      (1) a housing having front, rear, left and right side walls defining rectangular bottom entrance and top exit openings;
      (2) a plurality of vertical partitions running between and secured to said left and right side walls, alternate partitions having their lower ends starting in the plane of the bottom entrance opening and terminating at their upper ends short of the plane of the top exit opening, the remaining partitions having their upper ends starting in the plane of said top exit opening and terminating short of the plane of said bottom entrance opening, each of said partitions being corrugated along vertical bend lines to present a zig-zag appearance in top plan cross section; and,
      (3) a cloth-like fibrous filtering strip of width corresponding to the distance between said left and right side walls passing over the first of said alternate partitions, thence under the first of said remaining partitions, and continuing in an up and down manner to define upper folds about the ends of those partitions terminating short of the top exit opening and lower folds about the lower ends of those partitions terminating short of the bottom entrance opening, the portions of said strip between the upper and lower folds passing between the partitions being held in generally vertical parallel planes by said partitions, the corrugations defining with the strip a series of vertical channels of generally triangular cross section when viewed in plan, particulate and other impurities to be filtered from air entering said entrance opening accumulating in greatest concentrations in the form of slugs in the strip folds adjacent to the top exit opening; and
      (4) a thin screen overlying said bottom entrance opeing; and
   (b) a vacuum cleaning means for removing accumulated impurities from said at least one filter unit including:
      (1) a pair of guide tracks running along parallel and adjacent to the lower ends of the left and right side walls of said filter unit housing;
      (2) a vacuum head for connection to a vacuum source mounted for movement along said tracks to pass under said bottom entrance opening of said housing adjacent to said screen, said head having a vacuum slot extending between said left and right walls parallel to said folds, said slot being between ⅛ and ¼ the distance between said alternate partitions and having planar surfaces ahead and behind said slot in engagement with said screen extending in forward and rearward directions distances greater than said distance between alternate partitions; and
      (3) means for moving said vacuum head along said bottom entrance opening between said front and rear walls of said filter unit housing so that said slot successively applies vacuum to the channels defined by the alternate corrugated partitions as it traverses the same, the channels and slots cooperating to create a confined air movement in the channels of sufficient velocity to carry said slugs from the strip folds adjacent to said exit opening along with other impurities down the channels communicating with the slot opening to remove the slugs, said impurities themselves acting as mechanical scrubbers in their movement along the sides of the channels to further clean the strip portions between the partitions whereby said filter unit can be periodically cleaned by said vacuum system without mechanical shaking of the filters and without the necessity of disassembling the filter units.

2. A system according to claim 1, in which said vacuum head includes spaced thin flexible lips defining said slot so that close contact with the longitudinal edges of the lips defining the slot and said screen is assured during travel of said head along said screen.

3. A system according to claim 1, in which said vacuum head includes left and right enclosures travelling along said tracks and in communication with the vacuum head, said enclosures including openings at front and rear ends for cleaning the tracks as they move therealong.

4. A system according to claim 3, in which there are included guide rollers mounted to the underside of said enclosures for rotation about vertical axes, said rollers engaging opposed longitudinal edges of the tracks to inhibit lateral movement of the vacuum head as it moves along the tracks.

5. A system according to claim 4, in which there are provided a plurality of additional filter units each similar to said at least one filter unit in horizontal alignment, said tracks being coextensive with said units so that all of the filter units can be cleaned by a single pass of said vacuum head.

6. A system according to claim 5, including an impurity accumulating hopper coextensive with said units and positioned below the bottom entrance openings of the units for receiving impurities dropping by gravity; and an upper air guiding duct in communication with the exit openings of said units and including a blower for moving air through the filter units, said vacuum head being movable to clean said filter units without interrupting operation of said blower.

* * * * *